(12) United States Patent
Nakamura et al.

(10) Patent No.: US 7,505,098 B2
(45) Date of Patent: Mar. 17, 2009

(54) DISPLAY PANEL HAVING A REFLECTIVE LAYER AND MANUFACTURING METHOD THEREOF

(75) Inventors: Yayoi Nakamura, Hino (JP); Shigeru Morikawa, Hachioji (JP); Hiromitsu Ishii, Mitaka (JP)

(73) Assignee: Casio Computer Co., Ltd., Tokyo (JP)

( * ) Notice: Subject to any disclaimer, the term of this patent is extended or adjusted under 35 U.S.C. 154(b) by 298 days.

(21) Appl. No.: 11/232,320

(22) Filed: Sep. 21, 2005

(65) Prior Publication Data

US 2006/0061713 A1 Mar. 23, 2006

(30) Foreign Application Priority Data

Sep. 21, 2004 (JP) ............................ 2004-272908

(51) Int. Cl.
*G02F 1/1335* (2006.01)
(52) U.S. Cl. .................................................. 349/114
(58) Field of Classification Search ................. 349/114
See application file for complete search history.

(56) References Cited

U.S. PATENT DOCUMENTS

| 6,671,015 | B2 | 12/2003 | Tanada et al. | |
|---|---|---|---|---|
| 6,809,785 | B2 * | 10/2004 | Fujino | 349/114 |
| 7,015,996 | B2 | 3/2006 | Sakamoto et al. | |
| 2002/0075441 | A1 | 6/2002 | Fujimori et al. | |
| 2007/0171342 | A1 * | 7/2007 | Yang et al. | 349/114 |

FOREIGN PATENT DOCUMENTS

| CN | 1348115 A | 5/2002 |
|---|---|---|
| CN | 1421735 A | 6/2003 |
| JP | 2003-255375 A | 9/2003 |
| JP | 2003-255399 A | 9/2003 |
| JP | 2003-316294 A | 11/2003 |
| JP | 2004-020688 A | 1/2004 |
| JP | 2004-025247 A | 1/2004 |
| JP | 2004-046223 A | 2/2004 |

OTHER PUBLICATIONS

Chinese Office Action (and English translation thereof) daed Feb. 29, 2008, issued in counterpart Chinese Patent Application No. CN 200510129172.X.
Japanese Office Action (and English translation thereof) dated Mar. 11, 2008, issued in counterpart Japanese Patent Application No. JP 2004-272908.
Japanese Office Action (and English translation thereof) dated Jun. 24, 2008, issued in counterpart Japanese Patent Application No. JP 2004-272908.
Japanese Decision of Amendment Refusal and Decision of Rejection (and English translation of each) both dated Sep. 9, 2008, issued in counterpart Japanese Patent Application No. 2004-272908.

* cited by examiner

*Primary Examiner*—James A Dudek
(74) *Attorney, Agent, or Firm*—Frishauf, Holtz, Goodman & Chick, P.C.

(57) ABSTRACT

This invention provides a display panel characterized by having a substrate; an organic film having an irregular surface formed on the substrate; a reflective film formed on the irregular surface of the organic film; and a pixel electrode having a portion, at least the portion of the pixel electrode being overlapped with the reflective film.

24 Claims, 5 Drawing Sheets

DISPLAY PANEL HAVING A REFLECTIVE LAYER AND MANUFACTURING METHOD THEREOF

CROSS-REFERENCE TO RELATED APPLICATION

This application is based upon and claims the benefit of priority from the prior Japanese Patent Application No. 2004-272908, filed Sep. 21, 2004, the entire contents of which is incorporated herein by reference.

BACKGROUND OF THE INVENTION

1. Field of the Invention

The present invention relates to a display panel having a reflective layer and accompanying manufacturing method.

2. Description of the Related Art

In general, there are two types of liquid crystal displays (LCDs) known as a transmission type and a reflection type. A transmission type has a structure which displays light from a backlight arranged in the back surface side of the LCD panel that permeates the LCD panel and is easily viewable in a dark place. A reflection type has a structure which displays ambient light from the exterior to the inner part of the LCD panel that is reflected by a reflective layer arranged in the back surface side of the LCD panel and is easily viewable in a bright place. In order to realize an LCD panel which is easily viewable in bright as well as dark places, a semi-transmissive type (dual function transmission type and reflection type) LCD panel has been proposed. This is commonly known as a transflective LCD which has a structure that alternately acts as a transmission type and a reflection type LCD panel. When forming the reflective layer in the inner part of the LCD panel, because light from the exterior is not scattered (dispersed) by the reflective layer and light with high luminosity (brightness) is reflected in a specific direction, the display periphery becomes invisible. For this reason, generally, minute irregularities, composed of a number of convex and concave, are formed on the reflective layer surface. A reflection type LCD display panel which has a reflective layer with minute irregularities has been disclosed in Japanese Laid-Open (Kokai) Patent Application No. 2004-020688 titled "DISPLAY DEVICE AND METHOD FOR MANUFACTURING THE SAME." In the LCD panel described in this conventional prior art reference, a flat reflective layer composed of aluminum is formed on the upper surface of a glass substrate, an insulating film is formed on the upper surface of the glass substrate containing the reflective layer, a plurality of cross-sectional inverted trapezoid-shaped through holes with inclined surfaces are formed in the portion corresponding to the reflective layer of the insulating film and pixel electrodes composed of Indium-Tin-Oxide (ITO) having irregular surfaces follow the irregular surface of the insulating film containing the through holes with inclined surfaces and are formed in the upper surface of the insulating film containing the through holes with inclined surfaces.

Also, as for the LCD devices of the above-mentioned configuration, the flat reflective layer literally has only a light reflection function. Because the pixel electrodes follow the irregular surface of the insulating film containing the through holes with inclined surfaces and are formed in irregular shapes, light scattering functionality is exhibited by refraction in this portion and scatter reflections of outside light (ambient light) are performed as an integral whole.

However, in the LCD devices of the above-described configuration, because light scattering functionality is exhibited by refraction of the pixel electrodes which are composed of ITO and formed in irregular shapes, scattering is minor. Also, because the inclined angle of the through holes with inclined surfaces is uniform, reflected light becomes regular reflectance. Thus, there is a problem that sufficient light scattering reflection is not obtained.

SUMMARY OF THE INVENTION

The present invention has been made in view of the problem mentioned above. Accordingly, an object of the present invention is to provide a display panel having sufficient light scattering reflective functionality and accompanying manufacturing method.

In order to achieve the above-mentioned object, the display panel of the present invention is characterized by comprising a substrate; an organic film having an irregular surface formed on the substrate; a reflective film formed on the irregular surface of the organic film; and a pixel electrode having a portion, at least, the portion of the pixel electrode being overlapped with the reflective film.

Also, the manufacturing method of the display panel of the present invention is characterized by comprising preparing a substrate which has one surface; preparing an organic film which has irregularities on one surface; transferring the organic film on said one surface of the substrate so that said one surface of the organic film is faced upward; forming a reflective film on said one surface of the organic film; and forming a transparent pixel electrode having a portion so that at least the portion is overlapped with the reflective film.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Hereinafter, the preferred embodiments of the present invention will be described in detail with reference to the drawings.

First Preferred Embodiment

Figure 1:
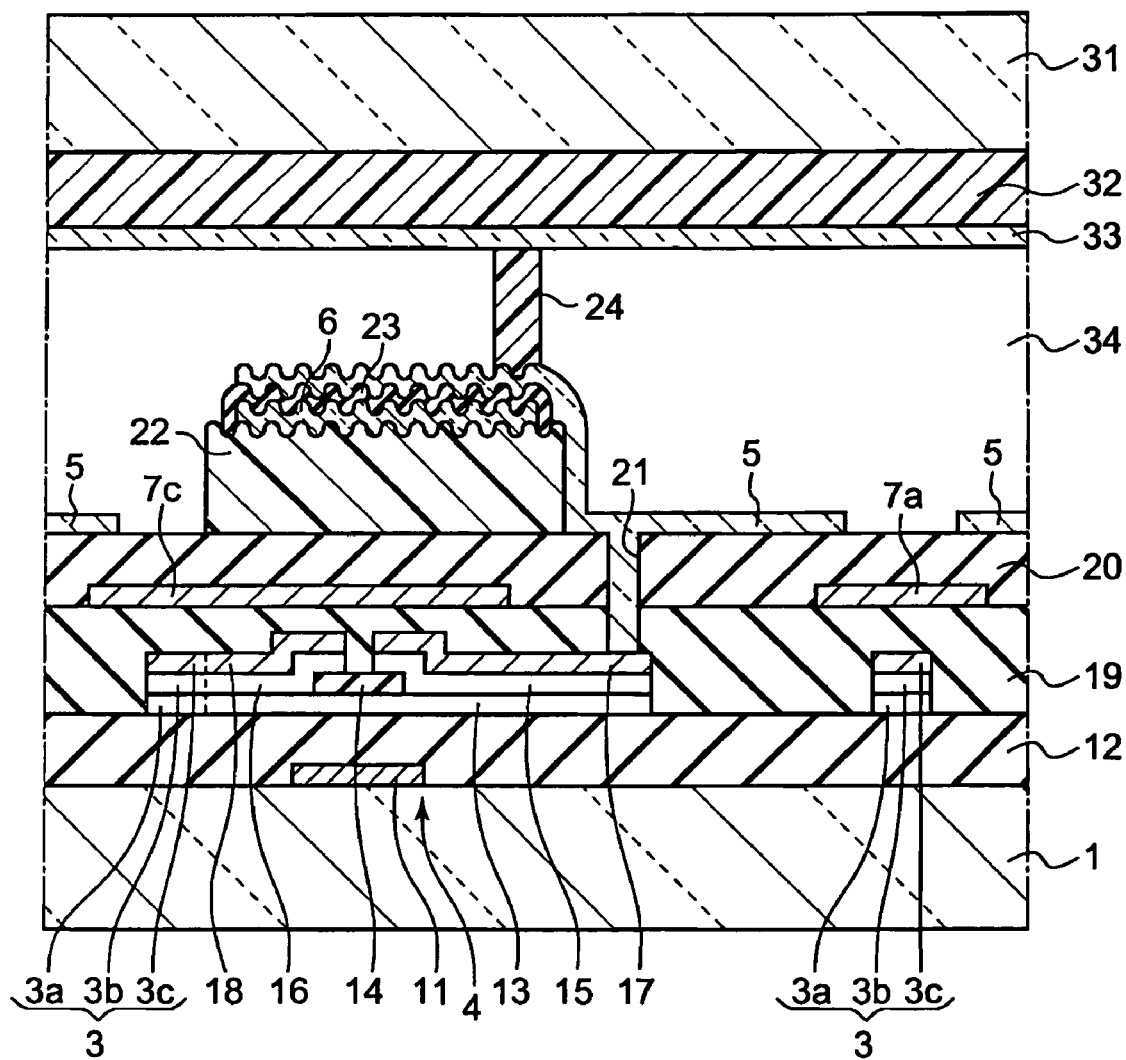
FIG. 1 is a cross-sectional plan view of the substantial part of a semi-transmissive reflection type LCD device on an active matrix substrate for the first preferred embodiment of the present invention.
Figure 2:
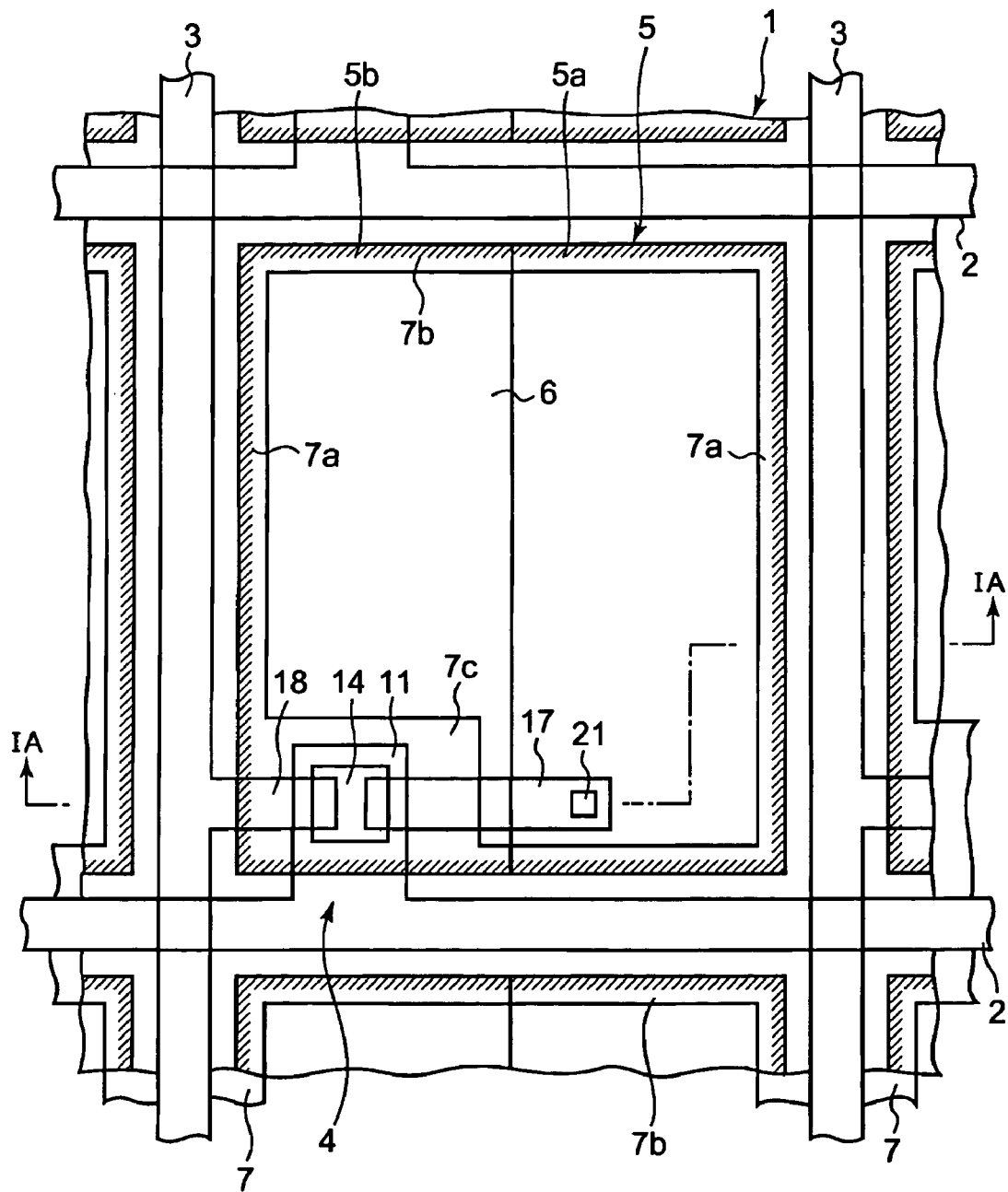
FIG. 2 is a permeation top view diagram of the thin film transistor substrate side in the LCD device shown in FIG. 1.

FIG. 1 is a cross-sectional plan view of the substantial part of a semi-transmissive reflection type LCD device on an active matrix substrate for the first preferred embodiment of the present invention. FIG. 2 is a permeation top view diagram of the thin film transistor substrate side in the LCD device shown in FIG. 1. In this case, FIG. 1 is a cross-sectional plan view corresponding to the portion following along the IA-IA line of FIG. 2. This LCD device is comprised with a thin film transistor substrate 1 and an opposing substrate 31 which are composed of a glass substrate, etc.

Initially, with reference to FIG. 2, the thin film transistor substrate 1 side will be explained. A scanning line 2 and a data line 3 are formed in matrix form on the upper surface side (opposing substrate 31 side and the opposing inner surface side) of the thin film transistor substrate 1. A thin film transistor 4, a pixel electrode 5 and a reflective film 6 are formed near each of the intersections. Further, a substantially lattice-shaped (grid) auxiliary capacitance electrode 7 is formed parallel to the scanning line 2 and the data line 3. Here, diagonal short solid line hatching is filled in on the edges of the pixel electrode 5 in order to clarify FIG. 2.

In this case, substantially the right half of the pixel electrode 5 constitutes the pixel electrode 5a for transmission (transmissive section) and substantially the left half constitutes the pixel electrode 5b for reflection (reflective section). The four side sections of the pixel electrode 5 are arranged on the periphery overlapping the substantially lattice-shaped auxiliary capacitance electrode 7. The pixel electrode 5b for reflection is arranged on the upper side of the reflective film 6. Accordingly, in the pixel electrode 5, the area excluding the reflective film 6 formation area and the auxiliary capacitance electrode 7 formation area is essentially a pixel (picture element) region for transmission. Specifically, in the pixel electrode section 5a, the area except for the auxiliary capacitance electrode 7 formation area is essentially a pixel region for transmission. The area corresponding to the reflective film 6 is a pixel region for reflection.

The auxiliary capacitance electrode 7 is substantially lattice-shaped and composed of a first auxiliary capacitance electrode section 7a which overlaps with the data line 3, a second auxiliary capacitance electrode section 7b which overlaps with the scanning line 2 and a third auxiliary capacitance electrode section 7c which overlaps with the thin film transistor 4. In this case, although explained later, the auxiliary capacitance electrode 7 is formed on a separate layer from the scanning line 2. In particular, the first auxiliary capacitance electrode section 7a is placed in the thickness direction, in other words, in the vertical direction space of FIG. 2 between the data line 3 and the pixel electrode 5 via an insulating film, respectively.

Also, the width of the first auxiliary capacitance electrode section 7a is to some extent larger than the width of the data line 3. Accordingly, even if the first auxiliary capacitance electrode section 7a has a positional gap in the direction which intersects with the data line 3, the data line 3 is definitely covered so that the data line 3 does not directly oppose the pixel electrode 5. Further, the first auxiliary capacitance electrode section 7a placement extends substantially over the entire layout area of the data line 3. Accordingly, even if the first auxiliary capacitance electrode section 7a has a positional gap in the direction paralleling the data line 3 to the pixel electrode 5, the first auxiliary capacitance electrode section 7a definitely overlaps with the left and right side sections of the pixel electrode 5 and fluctuation of the auxiliary capacitance electrode 7 due to the alignment gap of a particular orientation is reliably prevented.

The width of the second auxiliary capacitance electrode section 7b is to some extent larger than the width of the scanning line 3. Accordingly, even if the second auxiliary capacitance electrode section 7b has a positional gap in the direction which intersects with the scanning line 2, the second auxiliary capacitance electrode section 7b definitely overlaps with the scanning line 2. Further, the second auxiliary capacitance electrode section 7b placement extends substantially over the entire layout area of the scanning line 2. Accordingly, even if the second auxiliary capacitance electrode section 7b has a positional gap in the direction paralleling the scanning line 2 to the pixel electrode 5, the second auxiliary capacitance electrode section 7b definitely overlaps with the top and bottom side sections of the pixel electrode 5 and fluctuation of the auxiliary capacitance electrode 7 due to the alignment gap of a particular orientation is reliably prevented.

The third auxiliary capacitance electrode section 7c and the reflective film 6 are formed so that the thin film transistor 4 is covered. This reliably prevents incidence of outside light (ambient light) to the thin film transistor 4. Furthermore, because the third auxiliary capacitance electrode section 7c covers the lattice-shaped auxiliary capacitance electrode 7 and the reflective film 6, excluding the pixel region essential for permeation of the pixel electrode 5, it is not necessary to provide a black mask for light leakage prevention in the opposing substrate 31 described later and the open area ratio can be enlarged.

Next, the detailed structure of this LCD device will be explained with reference to FIG. 1. The scanning line (refer to FIG. 2) containing a gate electrode 11 composed of chromium, molybdenum, etc., is formed in a predetermined place on the upper surface of the thin film transistor substrate 1. A gate insulating film 12 composed of silicon nitride is formed on the upper surface of the thin film transistor substrate 1 containing the gate electrode 11 and the scanning line 2.

A semiconductor thin film 13 composed of intrinsic amorphous silicon is formed in a predetermined place on the upper surface of the gate insulating film 12 above the gate electrode 11. A channel protective film 14 composed of silicon nitride is formed in a predetermined place on the upper surface of the semiconductor thin film 13 above the gate electrode 11. An ohmic contact layer 15, 16 composed of n-type amorphous silicon is formed at each upper surface side of the channel protective film 14 and both of these sides are on the upper surface of the semiconductor film 13. The source-drain electrode 17 and 18, respectively, composed of chromium, molybdenum, etc., are formed on the upper surface of the ohmic contact layer 15, 16 sides. In this manner, the thin film transistor 4 is constituted by the gate electrode 11, the gate insulating film 12, the semiconductor film 13, the channel protective film 14, the ohmic contact layer 15 and 16 sides and the source-drain electrode 17 and 18, respectively.

The data line 3 is formed in a predetermined place on the upper surface of the gate insulating film 12. In this case, the data line 3 has a three layer structure sequentially from the lower part of an intrinsic amorphous silicon layer 3a, an n-type amorphous silicon layer 3b and a metal layer 3c composed of chromium, molybdenum, etc. Also, the intrinsic amorphous silicon layer 3a, the n-type amorphous silicon layer 3b and the metal layer 3c are connected to the semiconductor thin film 13, the ohmic contact layer 16 and the source-drain electrode 18 in the formation areas of the source-drain electrode 18.

A passivating insulating film 19 composed of silicon nitride is formed on the upper surface of the gate insulating film 12 containing the thin film transistor 4 and the data line 3. The auxiliary capacitance electrode 7 (7a, 7b, 7c) composed of chromium, molybdenum, etc., is formed in predetermined places on the upper surface of the passivating insulating film 19. An overcoat film 20 composed of silicon nitride is formed on the upper surface of the passivating insulating film 19 containing the auxiliary capacitance electrode 7. A contact hole 21 is formed in the passivating insulating film 19 and the overcoat film 20 above the source-drain electrode 17 side.

In the reflective film 6 formation area on the upper surface of the overcoat film 20, a gap control film 22 (organic film) composed of organic material, for example, epoxy resin, polyimide resin, etc., is provided so that the surface has an irregular surface structure. On this irregular surface of the reflective film 6, an insulating film 23 composed of natural oxide film or an oxidation treated film (oxide treatment), etc., is formed having an irregular surface and follows the above-mentioned irregular surface.

The pixel electrode 5 composed of ITO is formed in a predetermined place on the upper surface of the overcoat film 20 containing the insulating film 23 and connected to the source-drain electrode 17 via the contact hole 21. In this case, the pixel electrode 5 formed on the upper surface of the insulating film 23 constitutes an irregular shape and follows the irregular surface of the insulating film 23. The pixel electrode 5 and the reflective film 6 are electrically insulated by the insulating film 23 which intervenes between them. A columnar spacer 24 composed of resin, etc., is formed in a predetermined place on the upper surface of the pixel electrode 5 that is formed on the upper surface of the insulation film 23.

Next, the formation method of the gap control film 22 irregular surface will be explained.

First, in the irregular surface form which is produced as an uneven surface, the film for gap control film formation is composed of organic material, for example, epoxy resin, polyimide resin, etc., and formed by a printing method, a spin coating method, a die coating method, etc., so that the upper surface is flat. Next, reversed in an upside down style, the film for gap control film formation is transferred onto the upper surface of the overcoat film 20 as shown in FIG. 1. Subsequently, when this transferred film for gap control formation is patterned by a photo lithographic process, as seen in FIG. 1, the gap control film 22 with an irregular surface will be formed.

Here, although the irregular surface of the gap control film 22 in FIG. 1 is shown with a substantially uniform angle of inclination (gradient) and depth, the irregular surface shape, for example, can be formed by a thermocompression bonding method while rotating a roller which has irregularity over the resin film. Consequently, this effect is achievable by suitably varying the angle of inclination and depth of an irregular roller to produce a random angle of inclination and depth of irregular (uneven) form. Thus, random irregularity of the angle of inclination and depth can be formed in the surface of the film for gap control film formation and filled in this form, namely, the surface of the gap control film 22.

As other formation methods, in the upper surface of the overcoat film 20 as shown in FIG. 1, the film for gap control film formation is composed of organic material, for example, epoxy resin, polyimide resin, etc., and formed by a printing method, a spin coating method, a die coating method, etc., so that the upper surface is flat. Next, the film for gap control film formation is half-hardened. Then, irregularity is produced by rolling a heated roller with an irregular surface on the upper surface of the film for gap control film formation in a half-hardened state. Subsequently, when this transferred film for gap control formation is patterned by a photo lithographic process, as seen in FIG. 1, the gap control film 22 with an irregular surface will be formed.

Additionally, in the irregular surface of the gap control film 22 as seen in FIG. 1, although the angle of inclination to the upper surface (horizontal plane) is shown as more than 60 degrees, this is due to the circumstances of the drawing. In reality, in order to vertically reflect light which has entered an LCD device, it is preferable for the angle of inclination toward the upper surface to contain many angles of about 5 degrees~20 degrees.

In order to form the reflective film 6 above the gap control film 22, generally, the film for reflective film formation above the gap control film 22 is formed by a sputtering technique and made into the desired shape by a photo lithographic technique. Next, the insulating film 23 is formed above the reflective film 6, ITO is formed on the entire surface by sputtering and the pixel electrode 5 is formed using a photo lithographic technique. Here, in the case where an aluminum-based metal is used as a film for the reflective film formation, because a natural oxide film will be formed on the surface when the film for reflective film formation is formed by sputtering, it becomes unnecessary to form the insulating film 23 as a separate process. In the case of forming the insulating film 23 as a separate process, what is necessary is to form a silicon oxide film or silicon nitride film by CVD (Chemical Vapor Deposition) or sputtering and pattern by etching, etc.

On the other hand, a red, green, blue color filter 32 composed of resin is formed in the lower surface of the opposing substrate 31 (thin film transistor substrate 1 and the opposing inner surface side). A counter electrode 33 composed of transparent conductive material, for example, ITO, etc., is formed on the lower surface of the color filter 32. Also, within the thin film transistor substrate 1 and the opposing substrate 31, a columnar spacer 24 is formed above the pixel electrode 5 and stacked layer above the gap control film 22. The columnar spacer 24 and the gap control film 22 (pixel electrode 5, reflective film 6 and insulating film 23 are included) serve as the gap member and are mutually bonded together with a sealant (not shown). Also, liquid crystal 34 is filled in between both substrates 1 and 31 of the inner side sealant.

When using the LCD device of the above-mentioned configuration as a transmission type, upon lighting the backlight (not shown) arranged on the lower surface side of the thin film transistor substrate 1, the pixel transmissive region of the light from backlight is essentially among the thin film transistor substrate 1, the gate insulating film 12, the passivating insulating film 19, the overcoat film 20 and the pixel electrode 5, which exits toward the upper surface side of the opposing substrate 31 permeating the liquid crystal 34, the counter electrode 33, the color filter 32 and the opposing substrate 31 to perform display.

On the contrary, when using the LCD device of the above-mentioned configuration as a reflection type, lighting from a backlight is not used. Instead, outdoor light (ambient light) that enters from the upper surface side of the opposing substrate 31 permeates the opposing substrate 31, the color filter 32, the counter electrode 33, the liquid crystal 34, the pixel electrode 5 and the insulating film 23, which is reflected with the reflective film 6. This reflected light exits toward the upper surface side of the opposing substrate 31 through the reverse light path mentioned above and accordingly displays.

In this case, because the reflective film 6 is formed so as to have an irregular surface which follows the irregular surface of the gap control film 22 and due to the aluminum-based metal, scattering is significant on this irregular surface and a light scattering reflective function with anisotropy is exhibited. Furthermore, the gap between the reflective film 6 and the counter electrode 33 is $\frac{1}{3}$~$\frac{2}{3}$ of the gap between the pixel region for substantial permeation of the pixel electrode 5 and the counter electrode 33 according to the film thickness of the gap control film 22 below the reflective film 6. Preferably, when established at about ½, a multi-gap structure can be assumed to constitute the most optimum design for both a reflection factor and transmission factor.

Apart from that, in the LCD device of the above-mentioned configuration, the pixel electrode 5 and the reflective film 6 are electrically insulated by the insulating film 23 which intervenes between them. Therefore, when forming the pixel electrode 5 composed of ITO by a photo lithographic process after forming the insulating film 23 composed of natural oxide film or oxidation treated film, etc., on the surface of the reflective film 6 composed of an aluminum-based metal, cell reaction can be prevented from generating between the pixel electrode 5 composed of ITO and the reflective film 6 composed of an aluminum-based metal.

Furthermore, in the LCD device of the above-mentioned configuration, the first auxiliary capacitance electrode section 7a has a shape which is wider than the width of the data line 3 formed between the data line 3 and the pixel electrode 5. Accordingly, this first auxiliary capacitance electrode section 7a prevents coupling capacitance from being produced between the data line 3 and the pixel electrode 5. Thus, vertical cross talk is not be generated, which enhances the display properties.

Second Preferred Embodiment

Figure 3:
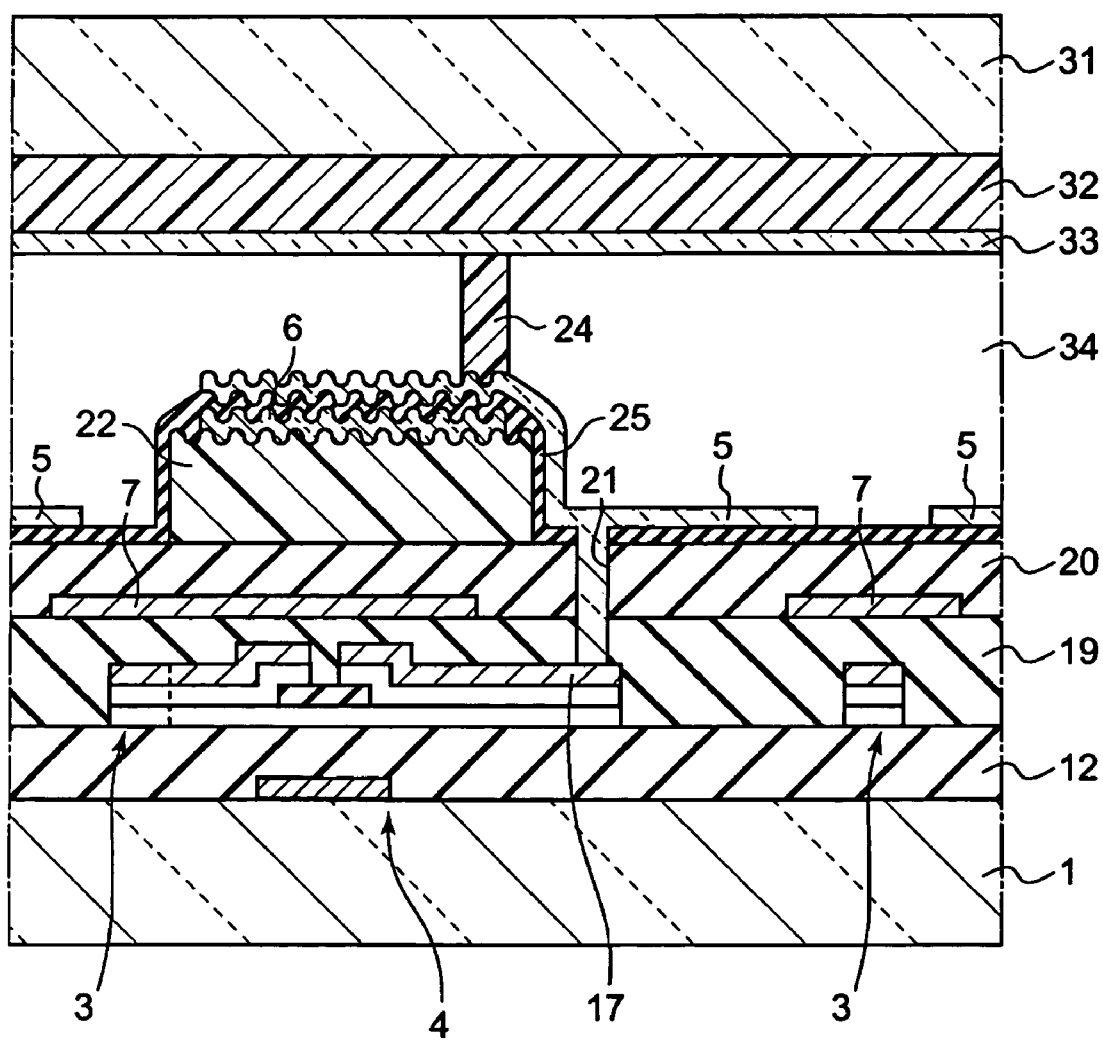
FIG. 3 is a similar cross-sectional plan view as FIG. 1 of the LCD device for the second preferred embodiment of the present invention.

FIG. 3 is a similar cross-sectional plan view as FIG. 1 of the LCD device for the second preferred embodiment of the present invention. In this LCD device, the difference from the case shown in FIG. 1 is that a thin insulating film 25 composed of inorganic material, for example, silicon nitride, silicon oxide, etc., is formed on the upper surface of the overcoat film 20 containing the reflective film 6 and the gap control film 22 instead of the insulating film 23. In this case, because of its thinness, the insulating film 25 follows along the irregular surface of the reflective film 6 in their regularly shaped form. Furthermore, the pixel electrode 5 is connected to the source-drain electrode 17 via the contact hole 21 provided in the insulating film 25, the overcoat film 20 and the passivating insulating film 19.

Third Preferred Embodiment

Figure 4:
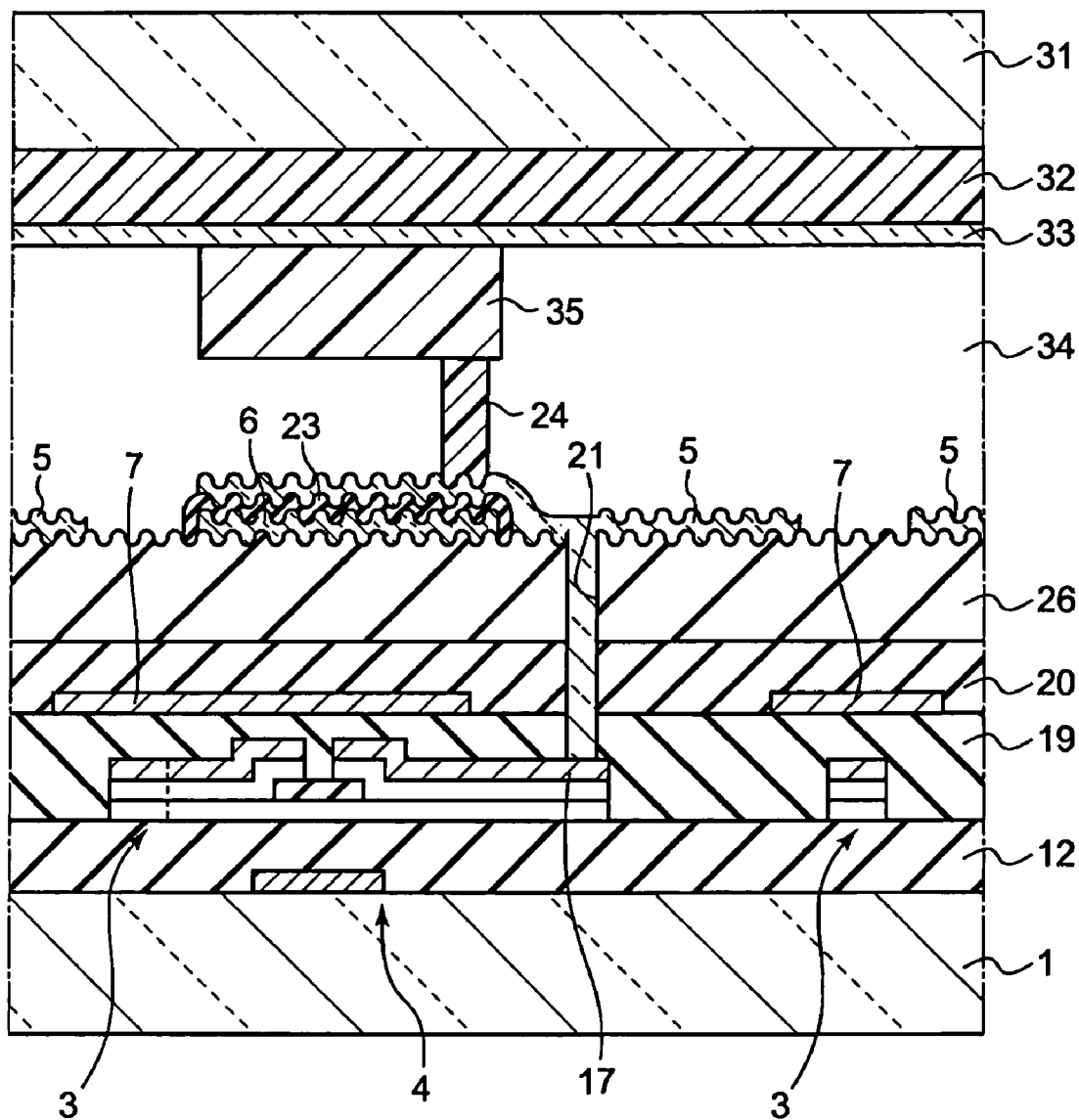
FIG. 4 is a similar cross-sectional plan view as FIG. 1 of the LCD device for the third preferred embodiment of the present invention.

FIG. 4 is a similar cross-sectional plan view as FIG. 1 of the LCD device for the third preferred embodiment of the present invention. In this LCD device, the most significant differences from the case shown in FIG. 1 are that a surface irregular film 26 composed of organic material, for example, epoxy resin, polyimide resin, etc., is formed on the upper surface of the overcoat film 20. The reflective film 6 which has an irregular surface follows this irregular surface formed in the irregular surface of the surface irregular film 26. The insulating film 23 which has an irregular surface follows this irregular surface formed in the irregular surface of the reflective film 6. The pixel electrode 5 which has an irregular surface follows this irregular surface formed in the irregular surface of the surface irregular film 26 containing the insulating film 23.

In this case, the pixel electrode 5 is connected to the source-drain electrode 17 via the contact hole 21 provided in the surface irregular film 26, the overcoat film 20 and the passivating insulating film 19. Furthermore, a transparent gap control film 35 composed of transparent organic material, for example, epoxy resin, polyimide resin, etc., is formed on the lower surface of the counter electrode 33 in the portion which opposes the reflective film 6. In addition, there is sufficient insulation between the pixel electrode 5 and the auxiliary capacitance electrode 7 by the surface irregular film 26. The overcoat film 20 may be thinner or the overcoat film 20 may be omitted.

Fourth Preferred Embodiment

In each of the above-mentioned preferred embodiments, although the cases where an amorphous silicon thin film transistor 4 have been explained, the present invention can also be applied to a polysilicon thin film transistor. Next, with reference to FIG. 5 which is a similar cross-sectional plan view as FIG. 1, an LCD device provided with a polysilicon thin film transistor for the fourth embodiment of the present invention will be explained.

Figure 5:
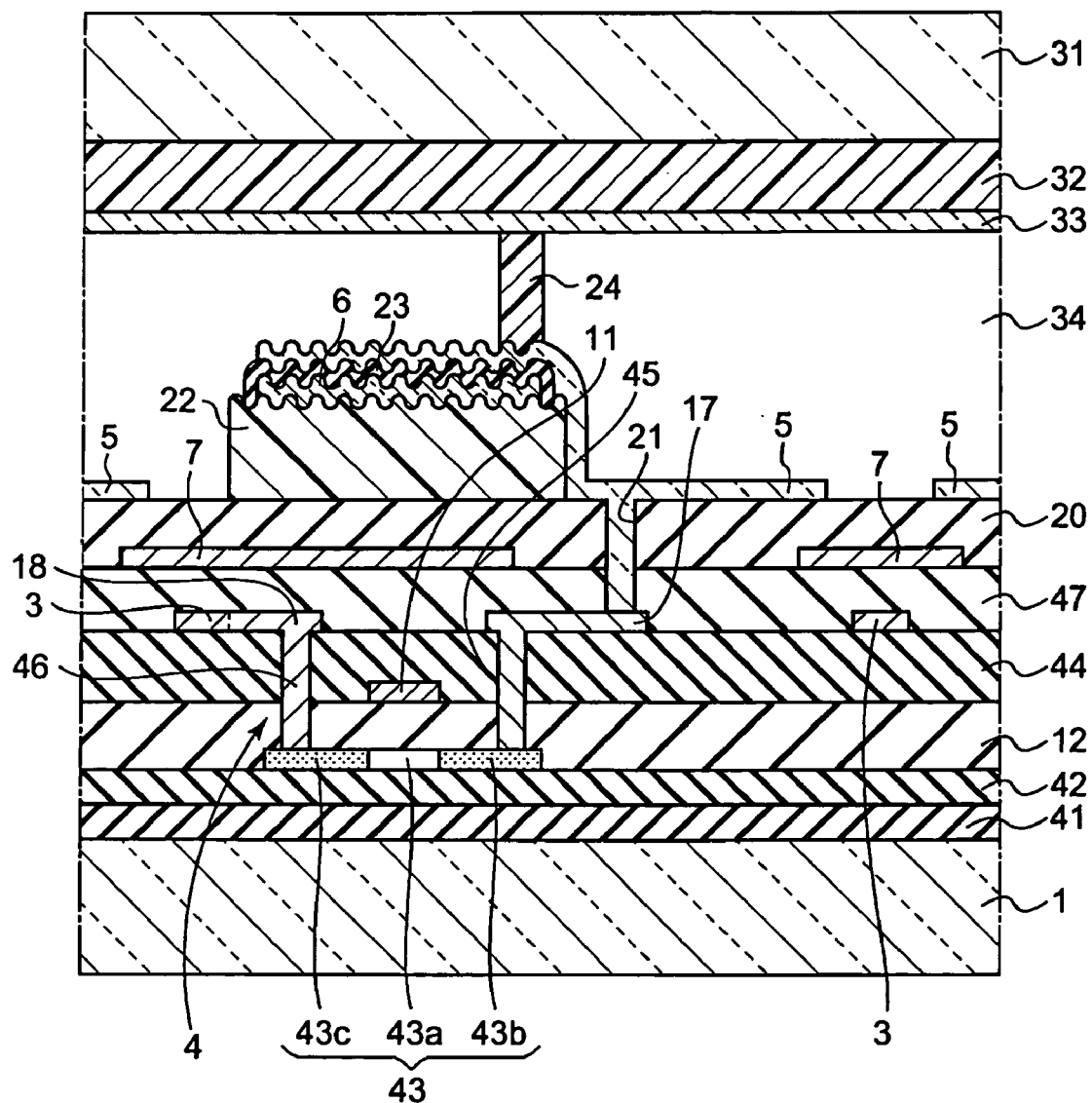
FIG. 5 is a similar cross-sectional plan view as FIG. 1 of the LCD device for the fourth preferred embodiment of the present invention.

As seen in FIG. 5, a second base insulating film 42 composed of a first base insulating film 41 composed of silicon oxide and a second base insulating film 42 composed of silicon nitride are formed on the upper surface of the thin film transistor substrate 1. A semiconductor thin film 43 composed of polysilicon is formed in a predetermined place on the upper surface of the second base insulating film 42. In this case, the central part of the semiconductor thin film 43a is the channel region composed of an intrinsic region and on either side is a source region 43b and a drain region 43c, respectively, composed of n-type impurity implant areas.

The gate insulating film 12 composed of silicon nitride is formed in the upper surface of the second base insulating film 42 containing the semiconductor thin film 43. The gate electrode 11 composed of chromium, molybdenum, etc., is formed in a predetermined place on the upper surface of the gate insulating film 12 above the channel region 43a. Additionally, the scanning line (not shown) composed of chromium, molybdenum, etc., is formed in a predetermined place on the upper surface of the gate insulating film 12 and connected to the gate electrode 11.

A first passivating insulating film 44 composed of silicon nitride is formed on the upper surface of the gate insulating film 12 containing the gate electrode 11, etc. A contact hole 45, 46 is provided in the gate insulating film 12 and the first passivating insulating film 44 above the source region 43b and the drain region 43c.

The source-drain electrode 17, 18 composed of chromium, molybdenum, etc., are formed in predetermined places on the upper surface of the first passivating insulating film 44 and connected to the source region 43b and the drain region 43c via the contact hole 45, 46, respectively. The data line 3 composed of chromium, molybdenum, etc., is formed in a predetermined place on the upper surface of the first passivating insulating film 44 and connected to the source-drain electrode 18.

In this manner, the thin film transistor 4 is constituted by the semiconductor thin film 43, the gate insulating film 12, the gate electrode 11, the first passivating insulating film 44, the contact hole 45, 46 and the source-drain electrode 17, 18, respectively.

The second passivating insulating film 47 composed of silicon nitride is formed on the upper surface of the first passivating insulating film 44 containing the source-drain electrode 17, 18 and the data line 3. The auxiliary capacitance electrode 7 composed of chromium, molybdenum, etc., is formed in predetermined places on the upper surface of the second passivating insulating film 47. The overcoat film composed of silicon nitride is formed on the upper surface of the second passivating insulating film 47 containing the auxiliary capacitance electrode 7. The contact hole 21 is provided in the second insulating film 47 and the overcoat film 20 above the source-drain electrode 17.

In the reflective film 6 formation area on the upper surface of the overcoat film 20, a gap control film 22 composed of organic material, for example, epoxy resin, polyimide resin, etc., is provided so that the surface has an irregular surface structure. On the irregular surface of the gap control film 22, the reflective film composed of an aluminum-based metal is formed having an irregular surface and follows this irregular surface. On this irregular surface of the reflective film 6, an insulating film 23 composed of natural oxide film or an oxidation treated film (oxide treatment), etc., is formed having an irregular surface and follows the above-mentioned irregular surface. The pixel electrode 5 composed of ITO is formed in a predetermined place on the upper surface of the overcoat film 20 containing the insulating film 23 and connected to the source-drain electrode 17 via the contact hole 21. In this case, the pixel electrode 5 formed on the upper surface of the insulating film 23 constitutes an irregular shape which follows the irregular surface of the insulating film 23.

Other Preferred Embodiments

In the above-mentioned preferred embodiments, although the reflective film 6 and the pixel electrode 5 are polymerized and formed above the gap control film 22 (organic film), it may also be possible to form the reflective film 6 not in this sequence, but above the pixel electrode 5. In this case, it is not necessary to insulate the reflective film 6 and the pixel electrode 5, as well as may also have electrical continuity. Also, a columnar spacer 24 can be formed in other areas other than above the gap control film 22.

Furthermore, although explained in the case of the pixel electrode 5 (and the reflective film 6) being formed in a stripe pixel array configuration linearly arranged (straight line) in a column direction with the data line 3 and the first auxiliary capacitance electrode section 7a linearly arranged in a column direction between the pixel electrode 5, it is also practicable to apply what is called a delta pixel array in which the pixel electrode 5 is shifted a half-pitch in every row. In that case, the data line 3 and the first auxiliary capacitance electrode section 7a is formed in a zigzag configuration in which the pixel electrode 5 is extended by a half-pitch in parallel with the scanning line 2 in between each row of the pixel electrode 5. Furthermore, although a thin film transistor is used as a switching element, another type of switching element can be applied, such as a diode, etc.

According to the present invention, the reflective film is formed above the organic film which has an irregular surface and the pixel electrode is formed with at least the portion above this reflective film polymerized. In this manner, the irregular reflective film surface which is irregular follows along with the irregular surface of the organic film. Accordingly, this design has a sufficient light scattering function for reflection by the reflective film.

While the present invention has been described with reference to the preferred embodiments, it is intended that the invention be not limited by any of the details of the description therein but includes all the embodiments which fall within the scope of the appended claims.

What is claimed is:

1. A display panel, comprising:
   a substrate;
   an organic film having an irregular surface formed on the substrate, the irregular surface having an angle inclination with respect to a horizontal plane that is substantially between 5 and 20 degrees;
   a reflective film formed directly on the irregular surface of the organic film; and
   a pixel electrode, at least a portion of which is formed to be overlapped on the reflective film.

2. The display panel according to claim 1, further comprising an insulating film which is intervened between the reflective film and the pixel electrode.

3. The display panel according to claim 2, wherein the insulating film comprises an oxidized film formed on a surface of the reflective film.

4. The display panel according to claim 2, wherein the insulating film comprises an inorganic insulating film formed on a surface of the reflective film.

5. The display panel according to claim 2, wherein the insulating film comprises an oxidized layer which is oxidized on the reflective film.

6. The display panel according to claim 1, wherein the reflective film comprises an aluminum-based metal, and the pixel electrode comprises an Indium-Tin-Oxide.

7. The display panel according to claim 1, wherein the pixel electrode comprises a pixel electrode section for reflection which is formed to be overlapped on the reflective film and a pixel electrode section transmission which is formed in an area adjacent to the reflective film on the substrate.

8. The display panel according to claim 1, wherein the reflective film is only formed on the organic film.

9. The display panel according to claim 1, wherein the panel further comprises an opposing substrate which opposes the substrate and a columnar spacer which is intervened between an inner surface of the opposing substrate and the organic film.

10. The display panel according to claim 9, wherein transparent gap control material is formed in an area of the inner surface of the opposing substrate that opposes the organic film.

11. The display panel according to claim 1, wherein a thin film transistor is formed between the substrate and the organic film; and
    wherein the pixel electrode is connected to a source-drain electrode of the thin film transistor.

12. The display panel according to claim 11, wherein an insulating film is intervened between the reflective film and the pixel electrode.

13. The display panel according to claim 12, wherein the reflective film and the pixel electrode are electrically insulated.

14. The display panel according to claim 11, wherein an auxiliary capacitance electrode is formed between the thin film transistor and the organic film, and an intermediate insulating film is formed between the auxiliary capacitance electrode and the thin film transistor.

15. The display panel according to claim 14, wherein a data line connected to the source-drain electrode of the thin film transistor is formed on the substrate, and the auxiliary capacitance electrode includes portions overlapped with the data line via the intermediate insulating film; and
    wherein a width of the portions of the auxiliary capacitance electrode overlapped with the data line is wider than a width of the data line.

16. The display panel according to claim 14, wherein the auxilary capacitance electrode overlaps with peripheral side sections of the pixel electrode.

17. A display panel, comprising:
    a thin film transistor substrate having a thin film transistor;

an opposing substrate which is arranged to oppose the thin film transistor substrate;

liquid crystal formed between the thin film transistor substrate and the opposing substrate;

an overcoat film which covers the thin film transistor formed on the thin film transistor substrate;

a gap control film which is formed on the overcoat film and which has an irregular surface, the irregular surface having an angle inclination with respect to a horizontal plane that is between 5 and 20 degrees;

a reflective film formed directly on the irregular surface of the gap control film; and a transparent pixel electrode, at least a portion of which is formed on the gap control film.

18. The display panel according to claim 17, further comprising an insulating film which is intervened between the reflective film and the pixel electrode.

19. The display panel according to claim 18, wherein the thin film transistor has a gate electrode and a source-drain electrode; and wherein the pixel electrode is connected to the source-drain electrode.

20. The display panel according to claim 19, wherein the reflective film and the pixel electrode are electrically insulated.

21. The display panel according to claim 17, wherein the gap control film is formed in an area corresponding to the thin film transistor on the overcoat film; and wherein the pixel electrode is formed to extend over the gap control film and the overcoat film.

22. The display panel according to claim 21, wherein a distance between the reflective film formed on the gap control film and an electrode provided on the opposing substrste is in a range of $1/3$ to $2/3$ which is situated in a $1/3 \sim 2/3$ of a distance between a portion of the pixel electrode formed on the overcoat film and the electrode provided on the opposing substrate.

23. The display panel according to claim 17, wherein the gap control film is formed on substantially an entire surface of the overcoat film.

24. The display panel according to claim 23, wherein the reflective film has an irregular surface which follows the irregular surface of the gap control film.

* * * * *